Jan. 28, 1969

G. HIRMANN 3,424,012

FRICTION GEAR

Filed Nov. 7, 1966

INVENTOR
GEORG HIRMANN

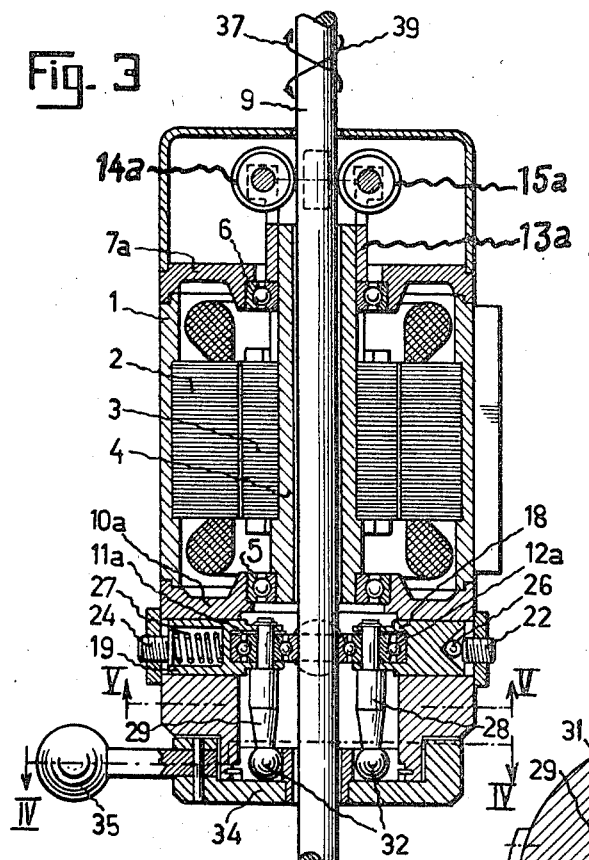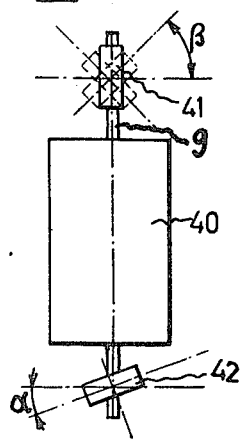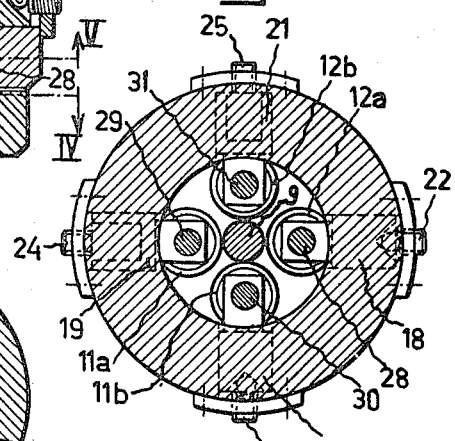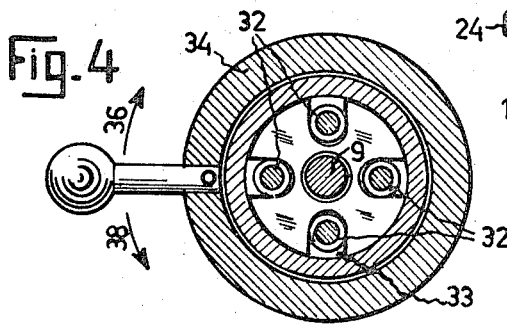

United States Patent Office 3,424,012
Patented Jan. 28, 1969

3,424,012
FRICTION GEAR
Georg Hirmann, Zurich, Switzerland, assignor, by mesne assignments, to Polyprodukte AG, Zurich, Switzerland
Filed Nov. 7, 1966, Ser. No. 592,460
Claims priority, application Switzerland, Nov. 19, 1965, 16,008/65
U.S. Cl. 74—25      5 Claims
Int. Cl. F16h 21/16; H02k 7/06

ABSTRACT OF THE DISCLOSURE

Friction gear for converting rotary motion to axial or helical motion, comprising a motor with a stationary and a rotary component, a pair of roller systems one connected to the stationary component, the other to the rotary component, and a driven member frictionally engaged by the rollers.

BACKGROUND OF THE INVENTION

The invention relates to friction gears. More in particular, the invention concerns a friction gear assembly for converting rotary movement to axial movement or to helical movement by using roller systems comprising a plurality of rollers for the transmission of the motion. Such a gear is suitable for tools operating with straight line axial movement, for example for planing. Furthermore, it is possible with such gears to operate tools working with rotary and straight line movement, for example drilling and thread cutting tools. A further possibility of application of the invention is to carry out feeding, adjusting or setting and control operations.

Friction gears for converting a rotary movement to an axial movement by the use of rollers are known per se. Here several rollers that are in frictional engagement with an operating shaft constitute a roller system which has imparted to it a rotary movement from the exterior. To the extent that the axes of the rollers are disposed obliquely with respect to the operating shaft and the latter is secured against rotation, the shaft effects an axial movement the speed of which depends on the angle between the axes of the rollers and the axis of the operating shaft. In the event that the operating shaft is not secured against rotation a helical movement is obtained which corresponds to the velocity of the drive. Thus with known arrangements merely a change in the feeding velocity of the operating shaft is possible, while a change of the rotary movement can only be undertaken in the drive, for example with a transmission gear.

A known arrangement employs a roller system having rollers, or rings, disposed alongside one another which serve for the same purpose. This roller system permits the simultaneous inclination of the rollers or rings and therefore possesses variable feeding velocity, while the rotation of the operating shaft remains the same.

SUMMARY OF THE INVENTION

It is an object of the invention to make it possible in a simple manner to change not only the feeding velocity, but also independently therefrom the rotating speed of the operating shaft, and that for forward and return movement.

An essential feature in accordance with the invention resides in the fact that two roller systems are provided, one of which is connected with a rotating drive and the other with a stationary part.

The mover or drive for both roller systems is preferably an electric motor, while one of the roller systems is connected with the rotor and the other with the stator.

The rotor is journalled, for example, upon a hollow shaft which at one end carries a roller system, and by means of which a shaft is guided that is rotatably and axially displaceable.

Each of the roller systems comprises several rollers having a running surface that is in engagement with the surface of the shaft under a predetermined pressure.

Preferably one roller system has rollers that are disposed at an angle between 0 and 90°, and the other roller system has rollers that are disposed parallel with respect to the operating shaft.

In one embodiment of the invention the roller system with the rollers disposed at an angle is connected to the rotor and the roller system with the rollers disposed parallel to the shaft is connected to the stator.

A different embodiment is arranged in such a manner that the roller system with the rollers disposed at an angle is connected with the stator and the roller system with the rollers extending parallel to the axis of the shaft is connected to the rotor.

One roller system is suitably provided with a means for adjusting the angular position of the rollers relative to the axis of the shaft.

It is also possible for the rollers of the two roller systems to be at an angle between 0 and 90° relative to the operating shaft.

In the same manner it is possible to provide each of the two roller systems with a means for adjusting the angle of their rollers relative to the operating shaft.

BRIEF DESCRIPTION OF THE DRAWINGS

Further details and advantages of the invention will become apparent from the following description with reference to the embodiments of the invention illustrated in the drawings, in which:

FIG. 3 is a friction gear as shown in FIG. 2, but with an arrangement for changing the inclination of the obliquely disposed rollers, FIG. 4 is a section taken along line IV—IV in FIG. 3, FIG. 5 is a section taken along line V—V in FIG. 3, and FIG. 6 is a schematic illustration of a friction gear where both roller systems carry obliquely disposed rollers.

DESCRIPTION OF THE INVENTION

Figure 1:
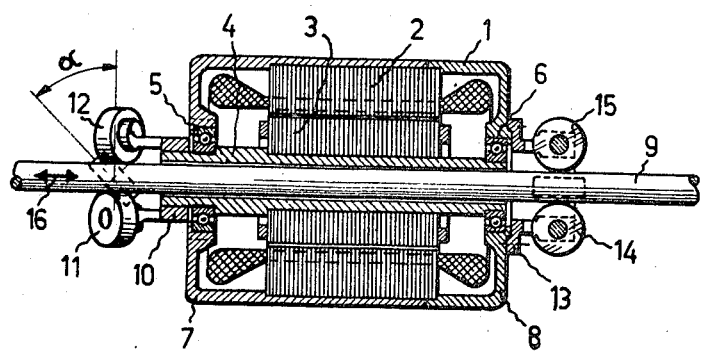
FIG. 1 is a friction gear with an electric motor where one roller system with axial rollers is secured to the housing and the other roller system with obliquely disposed rollers is secured to the rotary part of the motor.

The friction gear in accordance with FIG. 1 has a prime mover in the form of an electric motor having a housing 1, a stationary component or stator 2, and a rotary component or rotor 3. The rotor 3 is seated upon a hollow shaft 4 which is rotatably journalled in ball bearings 5, 6 in the bearing plates 7, 8.

An operating or driven shaft 9 extends through the hollow shaft 4 in which it is freely movable. One end of the hollow shaft 4 extends through the bearing plate 7 and supports a roller system 10 having rollers 11, 12 which are in frictional engagement with the operating shaft 9. The rollers 11, 12 are disposed obliquely with respect to the operating or driven shaft 9 and form an angle α with the center axis of the shaft, as indicated by the roller shown in dashed lines.

On the opposite side of the motor a roller system 13 is securely connected with the bearing plate 8 of the housing 1. The roller system 13 has rollers 14, 15 which extend in the direction of the center axis of the operating shaft 9. As the rotor 3 rotates, the operating shaft 9 moves axially in one of the two directions indicated by the arrow, but without following the rotation of the rotor.

Figure 2:
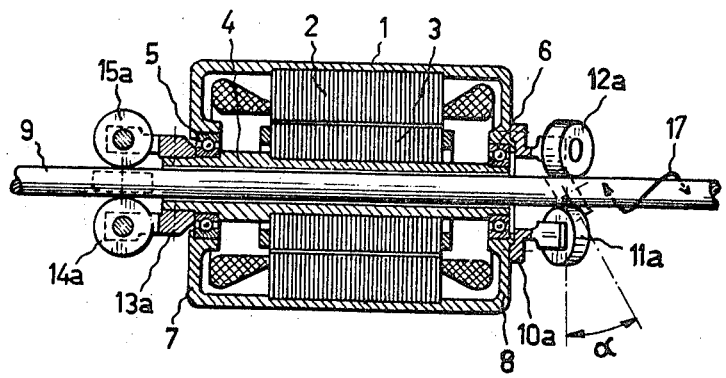
FIG. 2 is a friction gear similar to FIG. 1, but where the roller systems are interchanged.

The friction gear in accordance with FIG. 2 is constructed like that in accordance with FIG. 1 except for the roller systems. The roller system 13a with the axially directed rollers 14a, 15a, however, is connected with the rotary hollow shaft 4, and the roller system 10a with the rollers 11a, 12a with the bearing plate 8 at an angle α obliquely to the center axis. As the rotor 3 rotates the operating shaft 9 moves helically as indicated by the arrow 17.

The friction drive in accordance with FIG. 3 agrees essentially with the arrangement in accordance with FIG. 2. However, an additional means is provided whereby the inclination of the obliquely directed rollers 11a, 12a can be adjusted. For this purpose one of the bearing plates is reinforced and simultaneously constitutes a roller system 10a. Radially of the operating shaft 9 displaceable bearing sleeves 18, 19 and two further bearing sleeves 21 are provided with the roller system 10a. The bearing sleeves 20, 21 include further rollers 11b, 12b see FIG. 5.

The bearing sleeves 18 and 20 may be moved radially towards the operating shaft 9 by means of set screws 22 or 23. Between the set screws 22, 23 and the bearing sleeves 18 or 20 a bearing ball 26 is inserted for decreasing the friction. The bearing sleeves 19 and 21 are also provided with set screws 24, 25 which act on a pressure spring 27 located in the bearing sleeve 19 or 21 and thereby permit a balancing of the pressure forces. The rollers 11a, 11b, 12a, 12b are journalled upon pivotable bolts 28–31 which terminate in spherical ends 32. The spherical ends 32 are guided in corresponding recesses 33 of a rotatable ring 34 and may be adjusted simultaneously by means of the lever 35. By this means the oblique position of all rollers is equally changed.

The roller system 13a with the rollers 14a, 15a disposed parallel to the operating shaft 9 is connected with the hollow shaft 4 driven by rotor 3.

If the lever 35 is in the 0 position illustrated in FIG. 4, the rollers 11a, 11b, 12a, 12b are disposed with their planes perpendicularly to the center axis. As the rotor rotates the operating shaft 9 executes a pure rotary movement. If the lever 35 is moved in the direction of the arrow 36, the aforementioned rollers are positioned obliquely, whereby the operating shaft 9 effects a helical movement in accordance with the arrow 37. If the lever is moved in the direction of arrow 38, helical movement in the direction of the arrow 39 is obtained. Thus a rotary movement and simultaneously an axial displacement of the operating shaft 9 takes place.

The advancing or feeding velocity depends on the angle α between the rollers and the center axis of the operating shaft 9. The feeding path s is computed in accordance with the equation $$s = \frac{d \cdot \pi}{t_g \alpha}$$

where $d$ is the diameter of the operating shaft and α is the angle of inclination between the rollers and the center axis. The feeding velocity may be changed from zero to a maximum value, and that continuously in both directions of the center axis.

A further embodiment in accordance with FIG. 6 illustrates schematically a motor 40 having two roller systems 41, 42, the oblique position of both of which may be changed. One roller system 41, of which only one roller is shown in the drawing, is securely connected with the housing of the motor 40. The other roller system 42 is connected with the rotor of motor 40. The rollers 41, 42 are in frictional engagement with the operating shaft 9. By changing the angular inclination between rollers 41 or 42 and the center axis, the number of rotations of the driven shaft 9 can be changed. Different angular positions of the roller 41 are indicated in FIG. 6. If the roller 42 has a constant angle of inclination α and the roller 41 an angle of inclination β<90°, then the rated number of rotations causes an increase of the number of rotations of the operating shaft 9. In the case where the angle of inclination is β>90°, then a decrease of the number of rotations of the operating shaft 9 occurs; simultaneously the feeding velocity of the operating shaft is changed.

Having now described my invention with reference to the embodiments illustrated in the drawings, I do not wish to be limited thereto, but what I desire to protect by Letters Patent of the United States is set forth in the appended claims.

I claim:
1. Friction gear for converting rotary motion to axial or helical motion, comprising a prime mover such as an electric motor with a stator as the stationary component and a rotor as the rotary component, a hollow shaft connected to said rotary component, a pair of roller systems each comprising at least one roller, one said system being mounted on said stationary component and the other said system being mounted on said rotary component, a driven shaft disposed centrally of said rotary component and extending through said hollow shaft with its ends beyond said stationary and rotary components and each end of said driven shaft being in frictional engagement with one said roller system and being moved relative to said stationary, component, and one said roller system being disposed at an angle of between 0° and 90° relative to said driven shaft.

2. Friction gear in accordance with claim 1, including means operative to adjust the angular position of said rollers during operation.

3. Friction gear in accordance with claim 1, including adjusting means comprising pivotable members supporting the rollers of one of said system at one of their ends and a member in engagement with the other ends of said pivotable members operative to move said other ends and thereby change the angular position of said rollers.

4. Friction gear in accordance with claim 1, where the rollers of both said roller systems are disposed at an angle of between 0° and 90° relative to said driven shaft.

5. Friction gear in accordance with claim 1, including a plurality of pivotable members supporting at one of their ends the rollers of one said system, a rotatable ring having a plurality of recesses mounted on said stationary component and having a control lever, and the other end of each said pivotable members extending into one said recess and being movable with said ring for simultaneous adjustment of the angular position of said rollers.

References Cited

UNITED STATES PATENTS 2,808,498  10/1957  Hudson et al. _____ 15—104.3

FOREIGN PATENTS 710,135  6/1954  Great Britain.

FRED C. MATTERN, JR., *Primary Examiner.*

WESLEY S. RATLIFF, JR., *Assistant Examiner.*

U.S. Cl. X.R.

310—80